(12) United States Patent
Thomas

(10) Patent No.: US 9,630,449 B1
(45) Date of Patent: Apr. 25, 2017

(54) WHEEL INSTALLATION CRANE FOR COMBINES

(76) Inventor: Timothy S. Thomas, Bowdle, SD (US)

( * ) Notice: Subject to any disclaimer, the term of this patent is extended or adjusted under 35 U.S.C. 154(b) by 1273 days.

(21) Appl. No.: 13/596,565

(22) Filed: Aug. 28, 2012

(51) Int. Cl.
*B60B 29/00* (2006.01)

(52) U.S. Cl.
CPC .......... *B60B 29/001* (2013.01); *B60B 29/002* (2013.01)

(58) Field of Classification Search
CPC ..... B60B 29/002; B60B 30/10; B60B 29/001; B60C 25/025; B60C 25/04
USPC ................. 414/426–430, 731, 735
See application file for complete search history.

(56) References Cited

U.S. PATENT DOCUMENTS

| 2,792,139 | A | * | 5/1957 | Lloyd | ................... | B60B 29/002 |
| | | | | | | 414/428 |
| 3,501,037 | A | | 3/1970 | Donovan | | |
| 3,815,654 | A | | 6/1974 | Maddox | | |
| 4,123,038 | A | * | 10/1978 | Meyers | ................... | B66F 19/00 |
| | | | | | | 254/134 |
| 5,064,334 | A | * | 11/1991 | Cooley | ..................... | B66C 1/24 |
| | | | | | | 212/238 |
| 5,505,578 | A | * | 4/1996 | Fuller | ..................... | B66C 23/48 |
| | | | | | | 212/901 |
| 7,845,895 | B2 | * | 12/2010 | Barie | ........................ | B60S 9/12 |
| | | | | | | 414/427 |

* cited by examiner

*Primary Examiner* — Glenn Myers
(74) *Attorney, Agent, or Firm* — Robert C. Montgomery; Montgomery Patent & Design LP.

(57) ABSTRACT

An apparatus for removing and storing outer wheel assemblies from combines being transported on public roads is disclosed. The apparatus includes a pivoting dual-boom crane temporarily mounted to an attachment frame of a combine. The crane swings over either outside wheel assembly and provides a lifting support for installing or removing the wheel assembly. A dual-boom crane includes a wheel bar configured to grip and lift a wheel assembly. The wheel assemblies are then secured on the apparatus such that the combine can be transported over public roadways without exceeding a typical width limit.

18 Claims, 7 Drawing Sheets

WHEEL INSTALLATION CRANE FOR COMBINES

RELATED APPLICATIONS

Not Applicable.

FIELD OF THE INVENTION

The presently disclosed subject matter is related to moving wide loads over a highway. More particularly, the subject matter is an apparatus for removing, storing, and reinstalling outer wheel assemblies from combines to make them allowable for transportation on public roads.

BACKGROUND OF THE INVENTION

Modern agriculture relies on many different machines to produce the food we eat at high efficiency and low cost. America's food supply and, to a greater extent, its economic prosperity, depends on those machines and the farmers that operate them.

Perhaps the most well-known of farm machines is the combine: a machine for harvesting various grains. A combine implements three operations in one (1) machine: harvesting (reaping), threshing, and winnowing. Combines are widely used to harvest corn, soybean, wheat, oat, rye, barley, and flax. Most combines not only implement the three operations but also bail the otherwise unused materials for feed and bedding for livestock.

While combines are remarkably productive machines they are rather expensive, not well suited for driving down a highway, and are rather large. Because of the cost, combines must be efficiently used, which requires transportation from one (1) field to the next. But as noted, combines are wide, frequently wider than allowed on roadways. Typical roadway maximums are between ninety-six to one hundred-twenty inches (96-120 in.) wide.

Because of the width of a combine it is a common practice to remove the outer tires and rims on either side of the combine during transportation. Removing the outer tires and rims reduces the combine width to a dimension that can be legally transported over a highway on a trailer. However, combine tires and rims are often large and heavy. In the prior art removing such tires and rims usually required a crane, a forklift, or a winch as well as another vehicle to provide outside support for the combine. All of this increased the cost, difficulty, and complexity when transporting a combine.

Accordingly, there exists a need for an apparatus by which the outer tires and rims on combines can be easily removed, stowed, transported and re-installed for transportation on public roadways. Beneficially, such an apparatus would be fast and easy to use, would be an integral combine component, and would not require assist from a crane, forklift, winch, or another vehicle. Because of the weight of combine tires and rims the apparatus should be strong and rugged, should use available hydraulic mechanical systems, should support the tires and rims at all times, should be configurable as standard, optional, or add-on equipment, and should be readily adaptable to work with different makes, models, and years of combines.

SUMMARY OF THE INVENTION

The principles of the present invention provide for an apparatus for removing, storing, transporting, and re-installing outer wheel assemblies (tires and rims) from combines for transportation on public roads.

An apparatus that is in accord with the present invention includes a pivoting dual-boom crane that can be temporarily mounted to an attachment frame of a combine. The dual-boom crane is configured to swing over either outside wheel assembly and provide a lifting support for installing or removing the wheel assembly. A lower portion of the dual-boom crane is configured to grip and lift a wheel assembly. The outer wheel assemblies can be secured on the apparatus such that the combine can be transported over public roadways without exceeding a typical width limit.

A wheel installation crane that is in accord with the present invention includes a mounting frame assembly that is configured to vertically attach to an existing combine. The mounting frame assembly has a first wheel support member and a second wheel support member that horizontally protrude from the lower part of the mounting frame assembly. A first extension connects to the first wheel support member and a second extension connects to the second wheel support member. A wheel support bar extends between the distal ends of the first extension and the second extension. The wheel installation crane further includes a boom pivot member rigidly attached to the mounting frame assembly, an elongated first boom having a first boom pivot at one (1) end and a rotatable boom joint assembly at the other end, with the first boom being connected to the boom pivot member via the first boom pivot. A second boom is connected to the boom joint assembly at one (1) end to a wheel lifting bar at the other end. The first boom and the second boom can rotate and pivot to bring the wheel lifting bar into position to remove a wheel from a combine.

The foregoing wheel installation crane can also include a grated platform that extends between the first wheel support member and the second wheel support member. The first and second extensions may be attached to their respective wheel support members using hinges such that the extensions can fold backwards onto their respective wheel support members. A strap ratcheting mechanism may be disposed between the first and second wheel support members and the wheel support bar may pass through extension apertures. The first boom may also be retained by an upper boom pivot member that is attached to the mounting frame assembly and such that the first boom may rotate. First and second boom saddles rigidly attached to sides of the mounting frame assembly may be use to support the first boom.

A hydraulic lift is preferably disposed between the lower end of the boom joint assembly and the second boom. Hydraulic lines are attached to the hydraulic lift and can be used to hydraulic forces from a combine to the hydraulic lift. At least one (1) hook attachment is connected to an end of the said second boom. A connector attaches the wheel lifting bar to the at least one (1) hook attachment. Beneficially the wheel lifting bar is "C"-shaped and includes a bearing plate at one (1) end. Preferably the bearing plate includes a plurality of bearings.

According to another aspect of the invention a wheel installation crane includes a mounting frame assembly for attaching to a combine. The mounting frame assembly has a horizontal first wheel support member and a horizontal second wheel support member that protrudes from the lower part of the mounting frame assembly, a first extension having a first aperture at its distal end is connected to the first wheel support member by a first pivot and a second extension having a second aperture at its distal end is connected to the second wheel support member by a second pivot. A removable wheel support bar extends through the first and second apertures. The mounting frame assembly further includes a lock mechanism for temporarily securing the removable wheel support bar in place.

The wheel installation crane further includes a lower boom pivot member that is rigidly mounted to the bottom of the mounting frame assembly and an upper boom pivot member that is rigidly mounted to the top of the mounting frame. An elongated first boom having a first boom pivot at one (1) end and a rotatable boom joint assembly at the other end is connected such that the first boom pivot connects between the upper boom pivot member and the lower boom pivot member. An elongated second boom connects to the boom joint assembly at one (1) end while a "C"-shaped wheel lifting bar is operative attached to the other end of the second boom. The first boom and second booms can rotate and pivot to bring the wheel lifting bar into position to remove a wheel from a combine. To assist operations with some combines the upper boom pivot member and the lower boom pivot member are offset from the center of the mounting frame.

The foregoing wheel installation crane beneficially further includes a grated platform that extends between the first wheel support member and the second wheel support member, a strap ratcheting mechanism disposed between the first wheel support member and the second wheel support member; a boom saddle that is rigidly attached to a side of the mounting frame assembly such that the boom saddle is located and dimensioned to receive the first boom when the first boom maximally pivots in a first direction. The foregoing wheel installation crane also includes a hydraulic jack that is disposed between the boom joint assembly and the second boom, hydraulic lines for supplying the hydraulic jack with hydraulic power from a combine; a connector assembly for attaching the wheel lifting bar to the second boom, a bearing plate attached to the wheel lifting bar; and a plurality of bearings retained in the bearing plate.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

Figure 1:
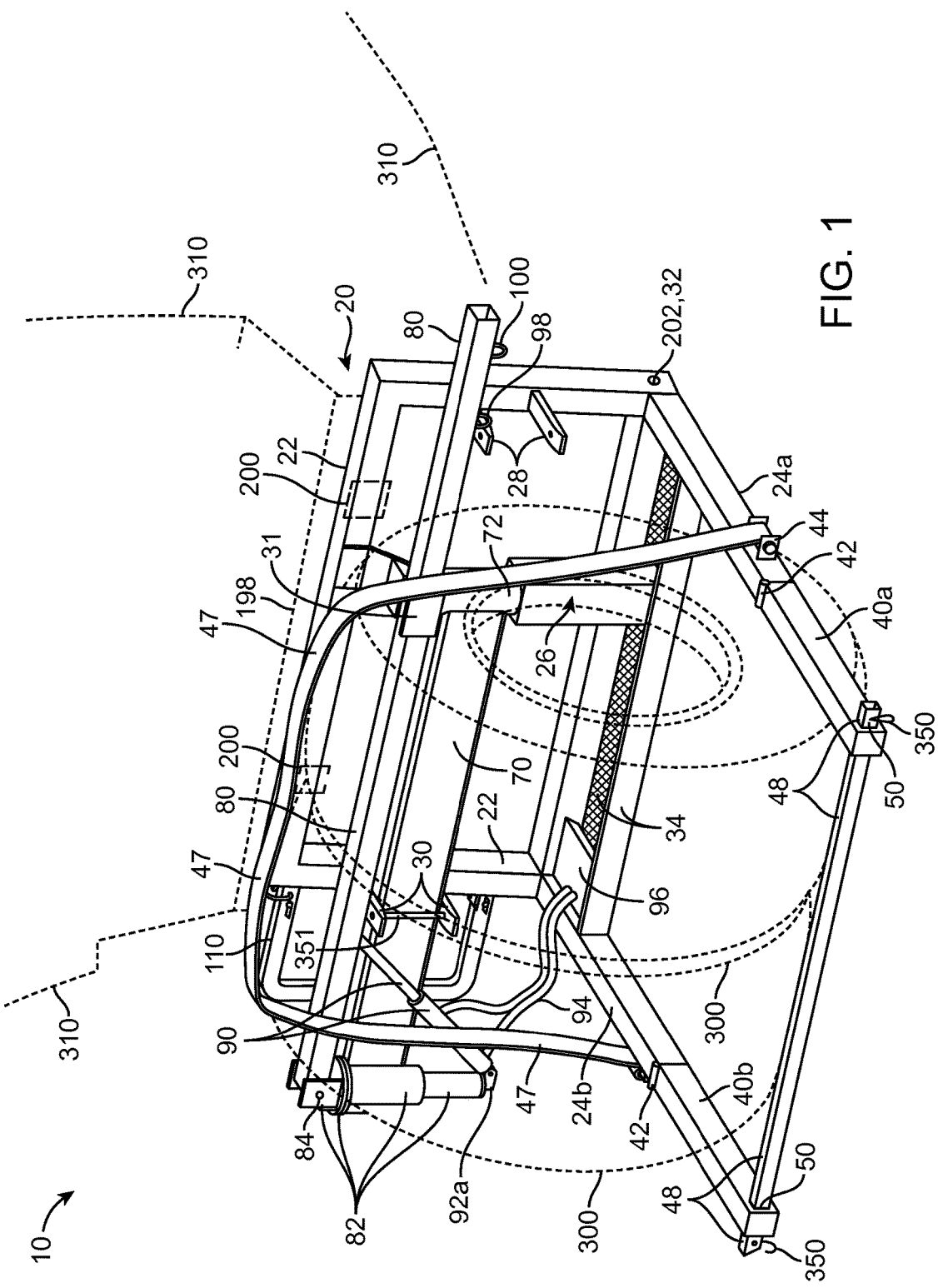
FIG. 1 is a right side perspective view of a wheel installation crane for combines 10 according to a preferred embodiment of the present invention and depicted in a state ready for transportation.

DESCRIPTIVE KEY 10 wheel installation crane for combines
20 frame assembly
22 mounting frame member
23 post
24a first wheel support member
24b second wheel support member
26 boom pivot member
27a upper boom pivot member
27b lower boom pivot member
28 first boom saddle
30 second boom saddle
31 third boom saddle
32 pin aperture
34 platform
40a first extension
40b second extension
42 extension hinge
44 strap ratcheting mechanism
46 strap channel
47 tie-down strap
48 wheel support bar
50 bar aperture
70 first boom arm
72 first boom pivot
80 second boom arm
82 boom joint assembly
84 vertical pivot pin
90 lift cylinder
92a first cylinder bracket
92b second cylinder bracket
94 hydraulic hose
96 hydraulic junction plate
98 first ring
100 second ring
110 wheel lifting bar
111 third ring
112 swivel hook
114 bearing plate
116 bearing
198 implement attachment frame
200 implement mounting bracket
202 implement mounting pin
300 wheel/tire assembly
310 combine
350 first pin fastener
351 second pin fastener
352 third pin fastener
354 first locking pin aperture

DETAILED DESCRIPTION OF THE PREFERRED EMBODIMENT

The best mode for carrying out the invention is presented in terms of its preferred embodiment, herein depicted within FIGS. 1 through 6. However, the invention is not limited to the described embodiment and a person skilled in the art will appreciate that many other embodiments of the invention are possible without deviating from the basic concept of the invention, and that any such work around will also fall under scope of this invention. It is envisioned that other styles and configurations of the present invention can be easily incorporated into the teachings of the present invention, and only one particular configuration shall be shown and described for purposes of clarity and disclosure and not by way of limitation of scope.

The terms "a" and "an" herein do not denote a limitation of quantity, but rather denote the presence of at least one of the referenced items.

Figure 2:
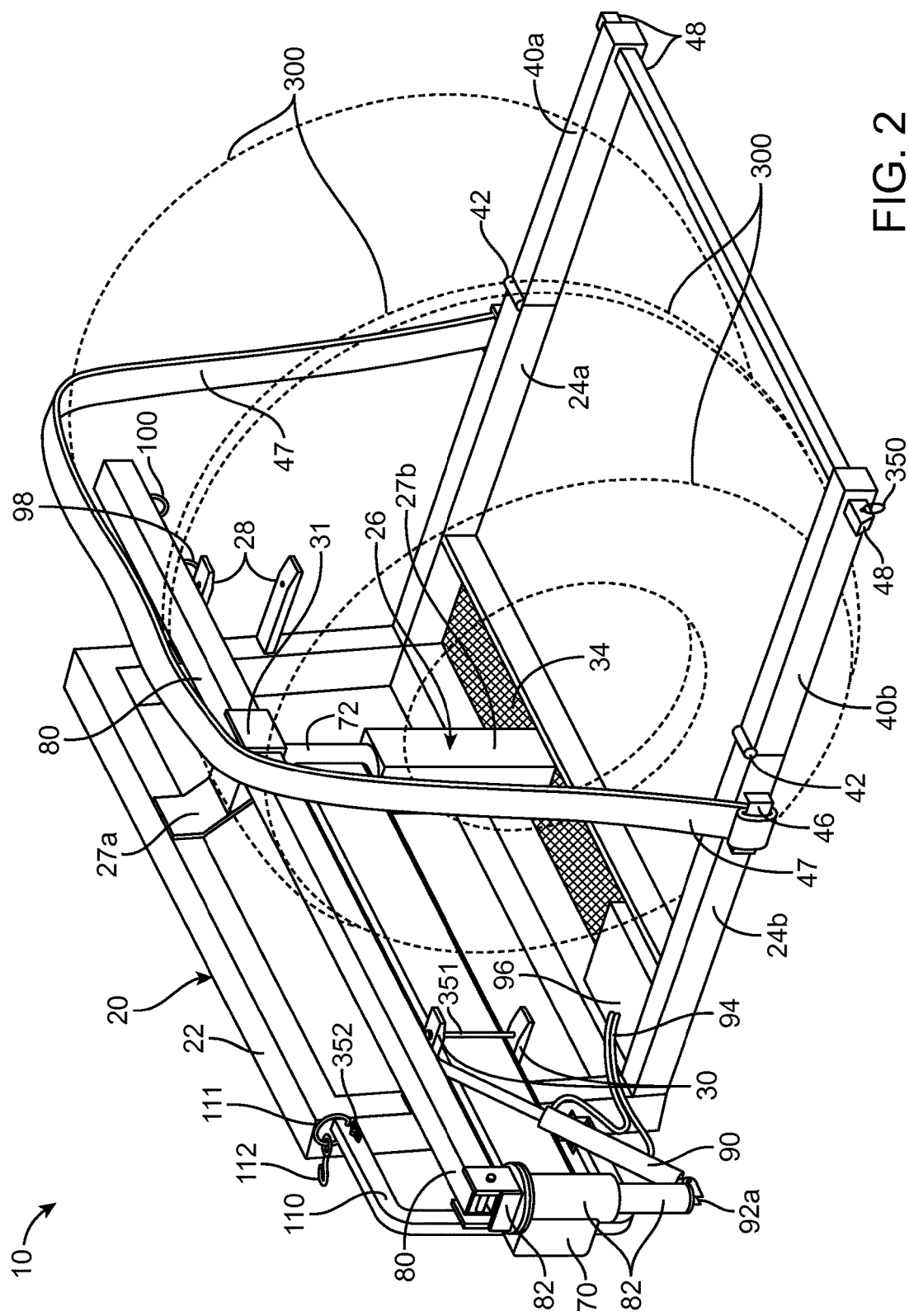
FIG. 2 is a left side perspective view of the wheel installation crane for combines 10 shown in FIG. 1 and depicted in a state ready for transportation.

FIGS. 1 and 2 respectively present right-side and left-side perspective views of an inventive wheel installation crane for combines 10 ready for transportation. The wheel installation crane for combines 10 provides a double-boom pivoting crane structure that is mountable upon an existing combine 310. The wheel installation crane for combines 10 assists installation and removal of the outer wheel/tire assemblies 300, see FIG. 3a, as well as providing storage of the wheel/tire assemblies 300 during transportation of the combine 310 on a trailer.

The wheel installation crane for combines 10 provides a double-boom pivoting crane structure that is mountable to a front implement attachment frame 198 of the combine 310. The wheel installation crane for combines 10 beneficially uses the existing combine structures that intended for attaching implements to the combine such as grain heads and corn heads. The double-boom pivoting crane structure may be swung from a stowed position to adjacent either of the outside wheel locations to provide lifting and positioning support while mounting the wheel/tire assemblies 300 to front axles of the combine 310. While the wheel installation crane for combines 10 is illustrated using an existing implement attachment frame 198 it should be understood that a frame assembly 20 can be modified with specific features, hardware, and the like, as needed for mechanical and hydraulic attachment to various makes and models of combines 310.

The wheel installation crane for combines 10 comprises a welded tubular frame assembly 20 for attaching to the existing combine 310. The frame assembly 20 includes a mounting frame member 22 that is beneficially designed to fit the existing implement attachment frame 198 of the combine 310. The mounting frame member 22 is a rectangular weldment and includes a forwardly protruding first wheel support member 24a, a second wheel support member 24b, a platform 34, a first extension 40a, a second extension 40b, and a wheel support bar 48.

The wheel support members 24a, 24b, platform 34, extensions 40a, 40b, and wheel support bar 48 define a substantially rectangular framed opening that is beneficially dimensioned to receive; cradle; and support bottom a pair of wheel/tire assemblies 300. The first wheel support member 24a and the second wheel support member 24b are beneficially integrally welded to the mounting frame member 22 so as to extend horizontally forward from its bottom corners. In practice the wheel support members 24a, 24b are approximately four feet (4 ft.) in length and are envisioned as being made from structural steel tubing approximately three inches square (3 in²) in cross-section.

The platform 34 spans between the wheel support members 24a, 24b and is fabricated using angle iron across its forward edge to form a rectangular horizontal framed structure that is spanned by grating. The grating provides a convenient work surface and/or a tool storage area.

The first extension 40a is attached to the first wheel support member 24a by an extension hinge 42 while the second extension 40b is attached to the second wheel support member 24b by another extension hinge 42. The extension hinges 42 allow the first extension 40a and the second extension 40b to fold backwards onto the wheel support members 24a, 24b when not in use. Those hinges also enable the first extension 40a and the second extension 40b to pivot in line with the wheel support member 24a, 24b during use.

The ends of the extensions 40a, 40b are connected together by a removable wheel support bar 48. The wheel support bar 48 is beneficially inserted through respective integral bar apertures 50 that are located at the ends of each extension 40a, 40b. The wheel support bar 48 is secured in place using first pin fasteners 350.

The wheel support members 24a, 24b respectively include a strap ratcheting mechanism 44 and a strap channel 46. A tie-down strap 47 spans between the strap ratcheting mechanism 44 and the strap channel 46. The tie-down strap 47 can be tightened to securely retain wheel/tire assemblies 300 placed in the rectangular framed opening defined by the wheel support members 24a, 24b, platform 34, extensions 40a, 40b, and wheel support bar 48.

Figure 3A:
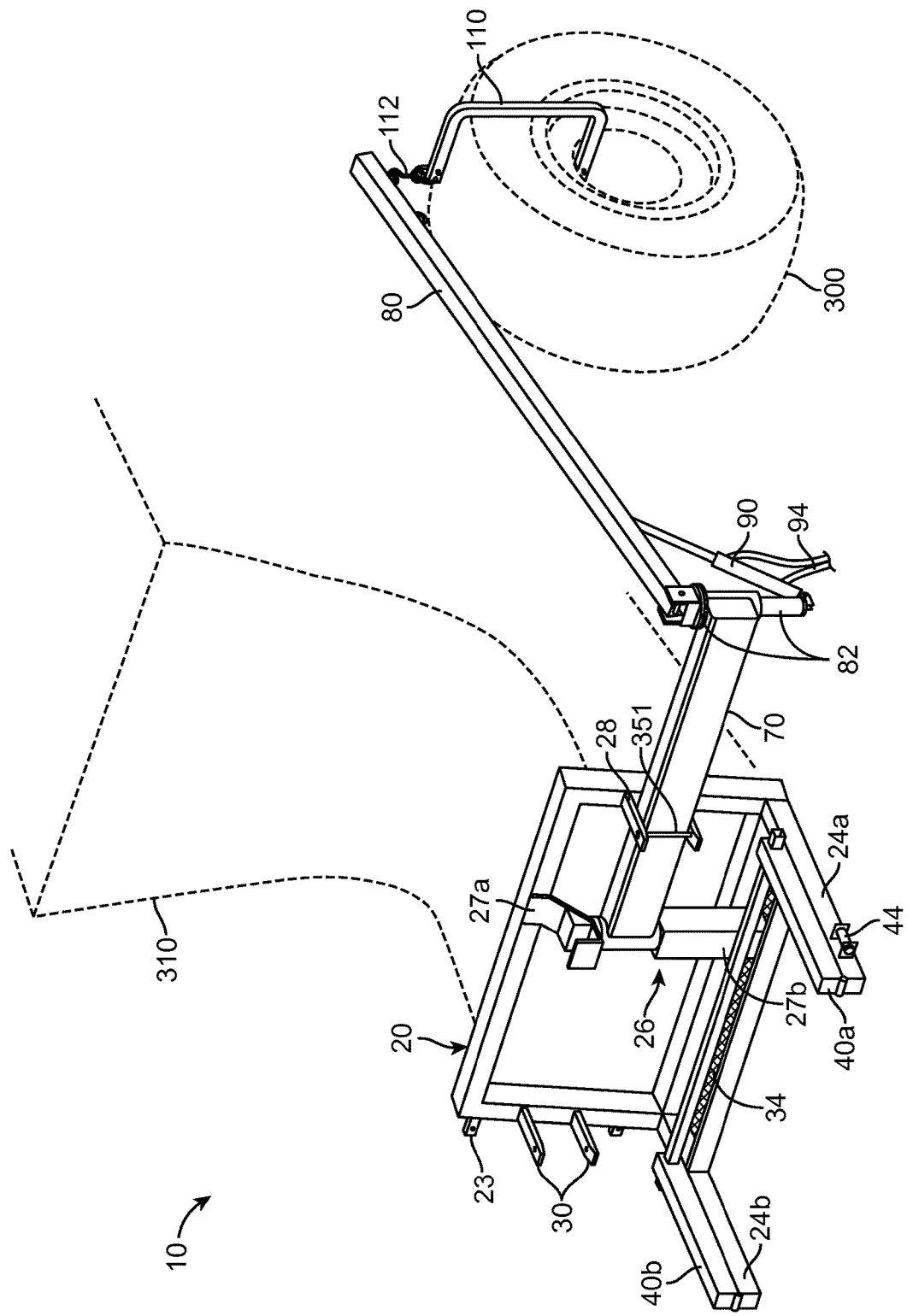
FIG. 3a is a perspective view of the wheel installation crane for combines 10 shown in FIGS. 1 and 2 depicting a side view showing the deployment of a first boom arm 70 and a second boom arm 80.
Figure 3B:
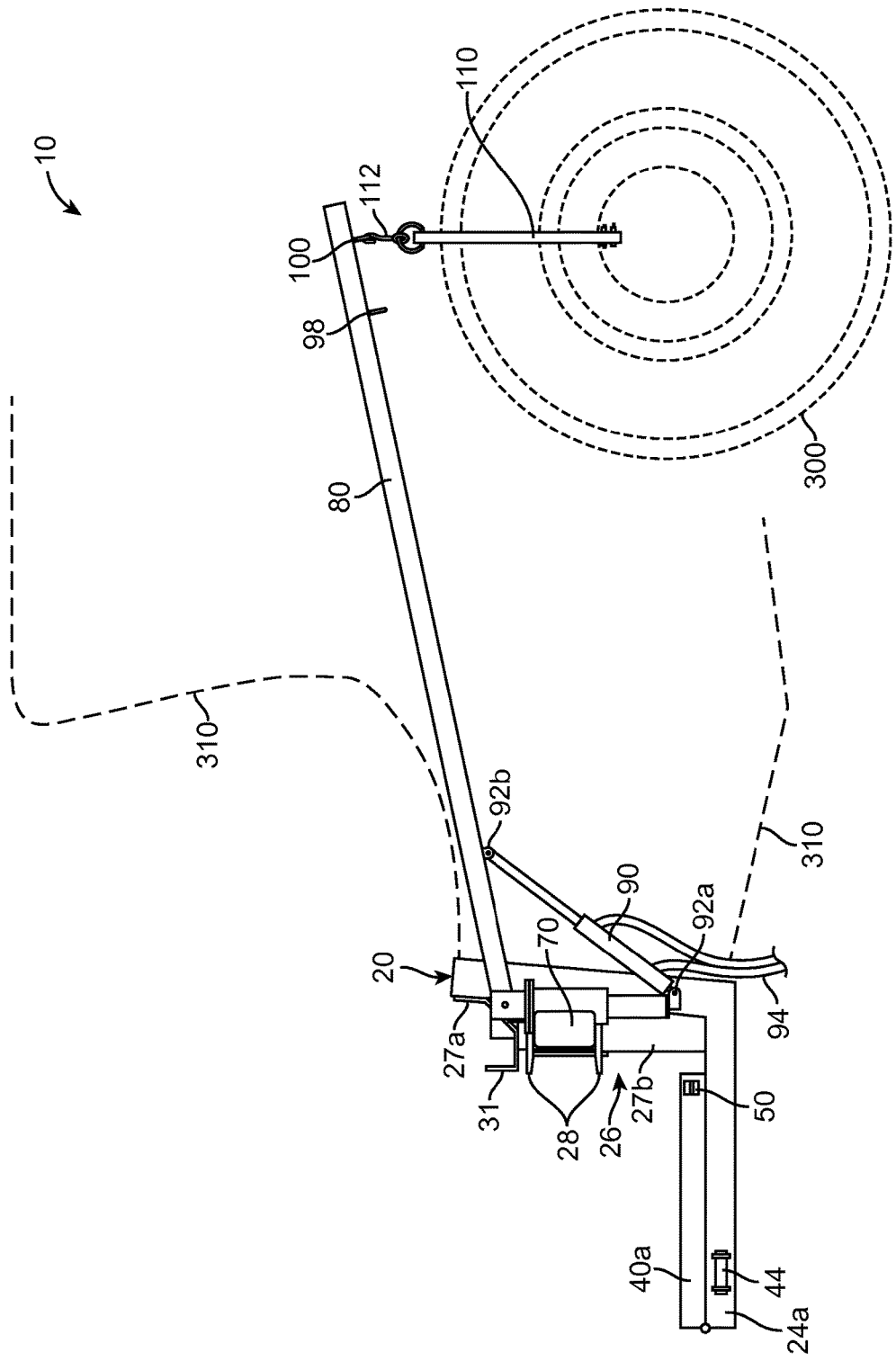
FIG. 3b is a side view of the wheel installation crane for combines 10 shown in FIGS. 1-3(a) depicting the installation of a wheel/tire assembly 300.

Referring now to the perspective and side views of the wheel installation crane for combines 10 shown in FIGS. 3a and 3b. Those views respectively show a right-hand deployment of a first boom arm 70 and second boom arm 80. The wheel installation crane for combines 10 provides a crane-like structure that is capable of lifting and positioning a wheel/tire assembly 300 for installation or removal from an axle of the combine 310. The wheel installation crane for combines 10 comprises the unitary welded frame assembly 20 that includes the integrally welded mounting frame member 22, the wheel support members 24a, 24b, a boom pivot member 26, a first boom saddle 28, a second boom saddle 30, and a third boom saddle 31.

The boom pivot member 26 provides a horizontal rotational attachment for the first boom arm 70 via an encompassing cylindrical first boom pivot 72. An upper boom pivot member 27a and a lower boom pivot member 27b of the boom pivot member 26 are respectively welded to the frame assembly 20. The lower boom pivot member 27b is envisioned as being made using structural steel tubing approximately six inches square (6 in²) in cross-section and which is positioned at a right-angle along the mounting frame member 22. The upper boom pivot member 27a beneficially comprises an angled flat stock bracket that connects to the top of the boom pivot member 26 and to the frame assembly 20. The first boom pivot 72 beneficially provides a full one-hundred eighty degrees (180°) of rotation. The first boom pivot 72 is vertically and horizontally secured within the first boom saddle 28 when rotated to an extreme right position and within the second boom saddle 30 when rotated to an extreme left-hand position.

The boom saddles 28, 30 comprise "U"-shaped forms that are welded to respective right and left vertical sides of the mounting frame member 22 such that an open side of the boom saddles 28, 30 face forward. The boom saddles 28, 30 are located such that they are at the same relative elevation as the first boom pivot 72. This enables the first boom arm 70 to fit into the open face of the boom saddles 28, 30 and to be mechanically secured within the respective boom saddles 28, 30 using a second pin fastener 351. The second pin fastener 351 is vertically inserted through an aligned pair of first locking pin apertures 354 located along the forward edges of each boom saddle 28, 30.

The upper 27a and lower 27b boom pivot members of the boom pivot member 26 are welded to respective upper and lower members of the mounting frame member 22 at a location about two feet (2 ft.) to the right of center. This moves the boom pivot member 26, the first boom arm 70, and the second boom arm 80 outward from center of the combine 310 to provide the necessary clearance around cab access stair that are often found on popular combine models 310.

The first boom arm 70 provides selective positioning at either the right or the left side to enable operating alignment during installation of the wheel/tire assembly 300 onto either the right or left sides of the combine 310. The first boom arm 70 rotates and pivots at its distal end where it attaches to the second boom arm 80 via a cylindrical boom joint assembly 82. The boom joint assembly 82 enables three-hundred sixty degree (360°) rotation of the second boom arm 80 along a horizontal plane as well as a pivoting the second boom arm 80 upwardly and downwardly via a pivot pin 84.

The second boom arm 80 beneficially comprises a linear section of structural steel tubing being of a particular length, envisioned as being approximately ten feet (10 ft.) in length. The second boom arm 80 enables aligning the wheel/tire assembly 300 with an axle of the combine 310 when maneuvered. The second boom arm 80 provides a means to vertically lift a wheel/tire assembly 300 using a hydraulic lift cylinder 90. The lift cylinder 90 is attached to a lower portion of the boom joint assembly 82 using a welded first cylinder bracket 92a, and to the bottom of the second boom arm 80 using a second cylinder bracket 92b.

The boom joint assembly 82 protrudes about three (3) feet below the first boom arm 70 to provide mechanical leveraging for the lift cylinder 90 when lifting the second boom arm 80 and a wheel/tire assembly 300. The second boom arm 80 includes a "C"-shaped wheel lifting bar 110 for grasping and lifting a wheel/tire assembly 300. The wheel lifting bar 110 grabs the wheel/tire assembly 300 along an upper part of the inner rim. Attachment of the wheel lifting bar 110 to the second boom arm 80 is enabled by a first ring 98, a second ring 100, and a swivel hook 112. The rings 98, 100 are welded to the bottom of the second boom arm 80 near its distal end and provide selective attachments for the wheel lifting bar 110 to lift (reference FIG. 6 and the discussion provided below).

The lift cylinder 90 comprises a bi-directional hydraulic unit having a stroke of approximately two to three feet (2-3 ft.) and which is capable of providing sufficient force to lift the second boom arm 80 and the attached wheel/tire assembly 300. The lift cylinder 90 includes a pair of hydraulic hoses 94 and a hydraulic junction plate 96 (also see FIG. 1) that supply pressurized hydraulic fluid for the lift cylinder 90. The hydraulic junction plate 96 uses the on-board hydraulic systems and controls within the combine 310.

Figure 4:
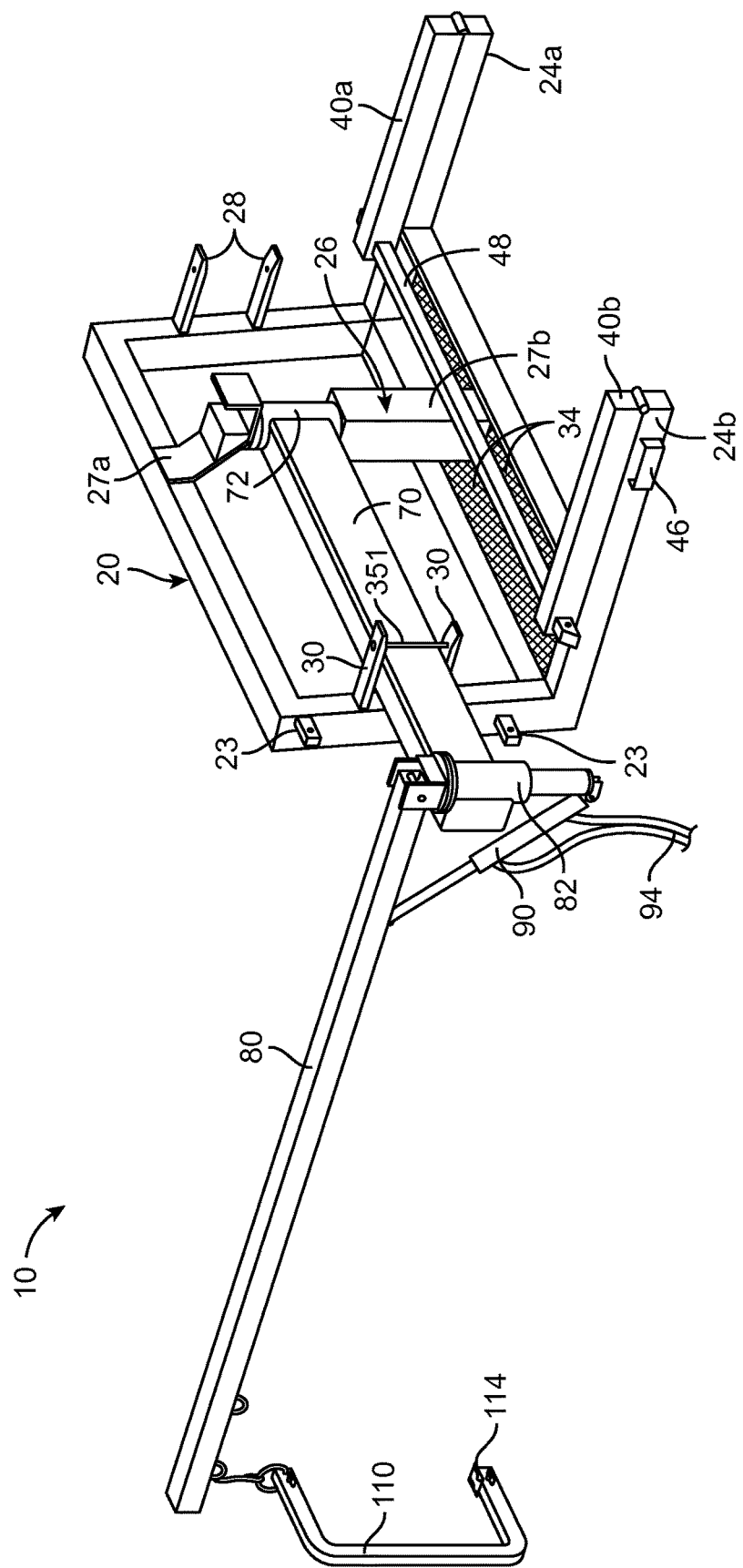
FIG. 4 is a perspective view of the wheel installation crane for combines 10 showing another side view of the deployment of the first boom arm 70 and the second boom arm 80.

FIG. 4 is a perspective view of the wheel installation crane for combines 10 depicting left-hand deployment of the first boom arm 70 and the second boom arm 80. The wheel installation crane for combines 10 is shown with the first boom arm 70 locked within the second boom saddle 30. This configuration enables installation or removal of a wheel/tire assembly 300 from the left side of the combine 310.

Figure 5:
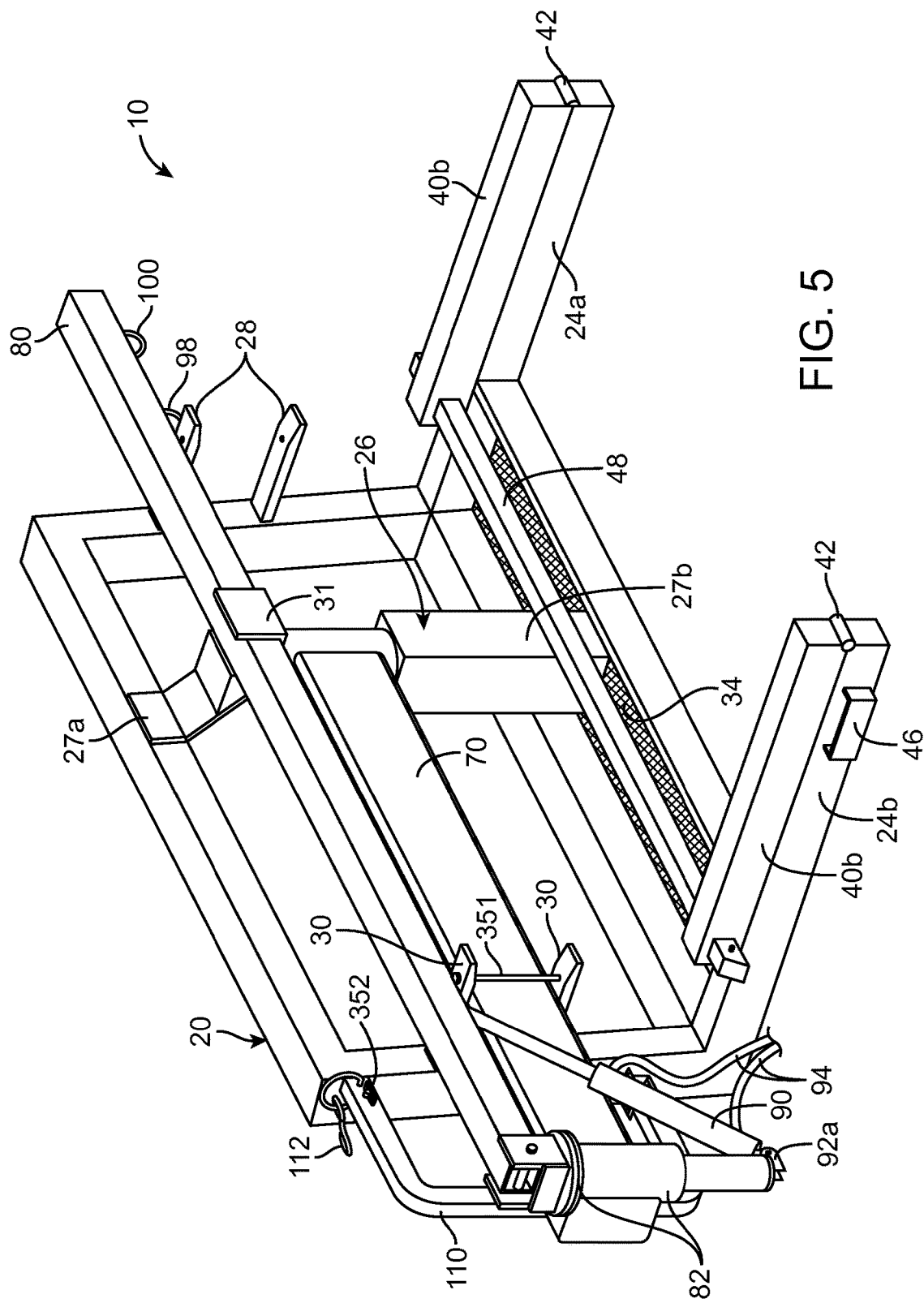
FIG. 5 is a perspective view of the wheel installation crane for combines 10 shown stowed; and, FIG. 6 is a close-up view of a wheel lifting bar 110 used in the wheel installation crane for combines 10 shown in FIG. 1-5.

FIG. 5 is a perspective view of the wheel installation crane for combines 10 in a stowed state. The wheel installation crane for combines 10 can be compactly stored by rotating the first boom arm 70 to the left, securing the first boom arm 70 in the second boom saddle 30 using the second pin fastener 351. The second boom arm 80 is then mechanically captured in a third boom saddle 31 that is welded to an upper forward-facing surface of the upper boom pivot member 27a. The third boom saddle 31 is an "L"-shaped welded appendage having an open-topped portion sized to snugly receive the second boom arm 80. The extensions 40a, 40b are then pivoted about the extension hinges 42 to rest on the wheel support members 24a, 24b. Straps may be used to retain the second boom arm 80 and extensions 40a, 40b in position if required.

Figure 6:
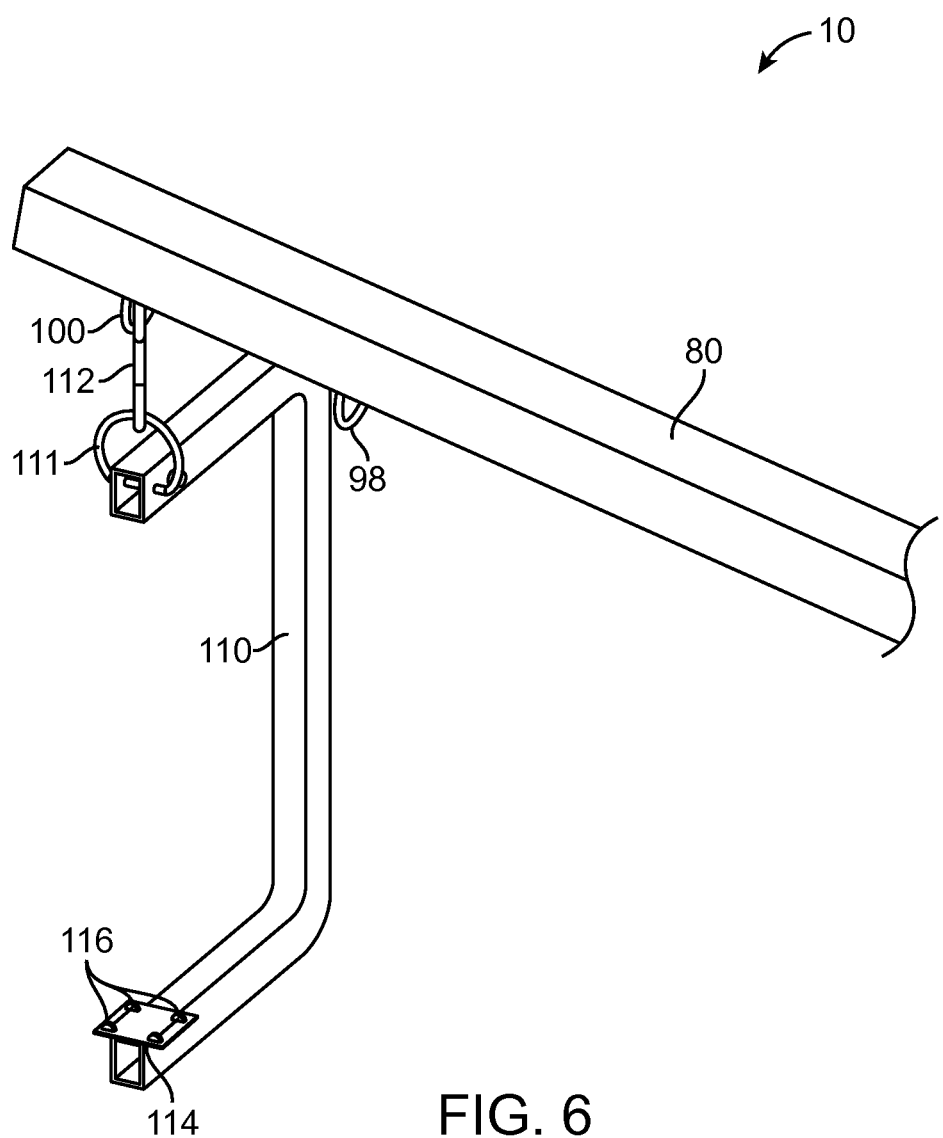

FIG. 6 presents a close-up view of the wheel lifting bar 110 of the wheel installation crane for combines 10. The wheel lifting bar 110 uses a third ring 111, a swivel hook 112, and a bearing plate 114 when moving a wheel/tire assembly 300. The third ring 111 is attached to the top of the wheel lifting bar 110 and provides a permanent connection for an eyelet of the swivel hook 112. In some applications the third ring 111 can be welded to the wheel lifting bar 110. The swivel hook 112 provides a removable attachment between the wheel lifting bar 110 with its third ring 111 and the rings 98, 100 on the second boom arm 80.

The wheel lifting bar 110 is a "C"-shaped structure beneficially made from rectangular structural tubing. At one (1) end of the wheel lifting bar 110 is a horizontal bearing plate 114. Typically the bearing plate 114 will be welded to the end of the wheel lifting bar 110. The bearing plate 114 is envisioned as being about eight inches square (8 in$^2$) and provides a contacting for the inner rim of a wheel/tire assembly 300 being removed or installed. The bearing plate 114 preferably has four (4) miniature rotating bearings 116 that are individually disposed at corner locations along the top of the bearing plate 114. The bearing plate 114 provides a rolling contact for the rim of a wheel/tire assembly 300 being removed or installed. These bearings 116 assist "self centering" of the bearing plate 114 during lifting, which minimizes swinging and/or damage to the wheel/tire assembly 300.

Referencing FIGS. 1, 2, and 4, the wheel lifting bar 110 may be compactly stowed using integral posts 23 that are located along the left side of the mounting frame member 22. Additionally, the wheel lifting bar 110 is secured in place using third pin fasteners 352, reference FIG. 5.

It is envisioned that other styles and configurations of the present invention can be easily incorporated into the teachings of the present invention, and while only one particular configuration is shown and described that is for purposes of clarity and disclosure and not by way of limitation of scope.

The preferred embodiment of the present invention can be utilized by the common user in a simple and effortless manner with little or no training. After initial purchase or acquisition of the wheel installation crane for combines 10 it would be installed and utilize as indicated in FIGS. 1 through 6.

The method of using the wheel installation crane for combines 10 to prepare a combine 310 for transportation upon a public highway is performed by: procuring the wheel installation crane for combines 10; mounting the wheel installation crane for combines 10 when in a stowed state to a combine 310 using the implement attachment features of the combine 310 to engage the top of the mounting frame member 22 in a hook-shaped implement mounting bracket 200; engaging the implement mounting pins 202 of the combine 310 into corresponding pin apertures 32 of the mounting frame member 22; pivoting the first extension 40a and the second extension 40b forward about the extension hinges 42; removing the wheel support bar 48 by detaching the first pin fasteners 350 and sliding the wheel support bar 48 out; lowering the wheel installation crane for combines 10 using the hydraulic controls and systems of the combine 310 until the wheel support members 24a, 24b and extensions 40a, 40b rest upon the ground; positioning a wheel/tire assembly 300 between the wheel support members 24a, 24b and extensions 40a, 40b; reinstalling the wheel support bar 48; routing the tie-down strap 47 up and over the wheel/tire assemblies 300; attaching and tightening the tie-down strap 47 to the strap channel 46 and the strap ratcheting mechanism 44; and, raising the wheel installation crane for combines 10 and wheel/tire assemblies 300 slightly above the ground surface using the on-board Hydraulic controls. The combine 310 is now ready for normal flatbed transportation over a public highway.

The method of using the wheel installation crane for combines 10 to install the previously secured wheel/tire assemblies 300 upon the combine 310 may be achieved by performing the following steps: lowering the wheel installation crane for combines 10 using the hydraulic cab controls of the combine 310 until the wheel support members 24a, 24b and extensions 40a, 40b rest on the ground; detaching and removing the tie-down strap 47 from the strap ratcheting mechanism 44 and the strap channel 46; removing the tie-down strap 47 from around the two (2) wheel/tire assemblies 300; removing the wheel support bar 48 as previously described; manually rolling the wheel/tire assemblies 300 to a convenient staging position; reinstalling the wheel support bar 48; folding the extensions 40a, 40b compactly onto the wheel support members 24a, 24b; installing a first wheel/tire assembly 300 by connecting the hydraulic junction plate 96 to the existing hydraulic connection equipment on the combine 310; lifting the second boom arm 80 out of the third boom saddle 31 using the lift cylinder 90 and onboard hydraulic controls of the combine 310; detaching the wheel lifting bar 110 from the posts 23 by removing the third pin fasteners 352; selectively attaching the wheel lifting bar 110 to the second boom arm 80 using the swivel hook 112 and a selected ring 98, 100; swinging and lifting the second boom arm 80 and the wheel lifting bar 110 into position to secure a wheel/tire assembly 300; positioning the bearing plate 114 along the inner rim of the wheel/tire assembly 300; lifting the second boom arm 80 using the onboard hydraulic controls to raise the wheel/tire assembly 30 above the ground; swinging the second boom arm 80 and wheel/tire assembly 300 around to the axle of the combine 310; using the wheel installation crane for combines 10 to align and connect the wheel/tire assembly 300 to a right front axle of the combine 310; and, separating the wheel lifting bar 110 from the installed wheel/tire assembly 300 by lowering the second boom arm 80.

The method of installing the second wheel/tire assembly 300 to the combine 310 may be achieved by performing the following steps: detaching the second pin fastener 351 from the first boom saddle 28; swinging the first boom arm 70 from its stowed position within the first boom saddle 28, swing the first boom arm 70 one-hundred eighty degrees (180°) and into the second boom saddle 30; securing the first boom arm 70 using the second pin fastener 351; positioning the second boom arm 80 to engage the wheel lift bar 110 into the rim of the second wheel/tire assembly 300; lifting the wheel/tire assembly 30 using the lift cylinder 90 and the hydraulic controls of the combine 310 as previously described; moving the second wheel/tire assembly 300 to a left side axle of the combine 310; using the wheel installation crane for combines 10 to align and connect the wheel/tire assembly 300 to a front left axle of the combine 310; and, separating the wheel lifting bar 110 from the installed wheel/tire assembly 300 by lowering the second boom arm 80.

The method of returning the wheel installation crane for combines 10 to its stowed state for storage or return shipping may be achieved by performing the following steps: removing the wheel lifting bar 110 from the second boom arm 80 by detaching the swivel hook 112 from a ring 98, 100 of the second boom arm 80; stowing the wheel lifting bar 110 upon the posts 23 of the mounting frame member 22 and securing using the third pin fastener 352; releasing the first boom arm 70 from the second boom saddle 30 by removing the second pin fastener 351; swinging and securing the first boom arm 70 within the first boom saddle 28 and securing using the second pin fastener 351; moving and lowering the second boom arm 80 into the third boom saddle 31 of the mounting frame member 22; lowering the wheel support members 24a, 24b onto the ground using the hydraulic cab controls of the combine 310; disconnecting hydraulic hoses 94 and the hydraulic junction plate 96 from the combine 310; and disengaging the implement mounting pins 202 and implement mounting bracket 200 of the combine 310 by tilting the implement attachment frame 198 using the hydraulic cab controls of the combine 310. In this manner, the combine 310 may be transported to other harvesting locations or to a source destination using public roadways without exceeding the typical width limit. Upon arrival at the next location the wheel installation crane for combines 10 is used in removal or reinstallation the wheel/tire assemblies 300.

The foregoing descriptions of specific embodiments of the present invention have been presented for purposes of illustration and description. They are not intended to be exhaustive or to limit the invention and method of use to the precise forms disclosed. Obviously many modifications and variations are possible in light of the above teaching. The embodiment was chosen and described in order to best explain the principles of the invention and its practical application, and to thereby enable others skilled in the art to best utilize the invention and various embodiments with various modifications as are suited to the particular use contemplated. It is understood that various omissions or substitutions of equivalents are contemplated as circumstance may suggest or render expedient, but is intended to cover the application or implementation without departing from the spirit or scope of the claims of the present invention.

What is claimed is:

1. A wheel installation crane, comprising:
   a mounting frame assembly configured to vertically attach to an existing combine, said mounting frame assembly having a first wheel support member and a second wheel support member that both horizontally protrude from the lower part of the mounting frame assembly, said mounting frame assembly further including a first extension that extends horizontally from said first wheel support member, a second extension that extends horizontally from said second wheel support member, and a wheel support bar that extends between the distal ends of said first extension and said second extension;
   a boom pivot member rigidly attached to said mounting frame assembly;
   an elongated first boom having a first boom pivot at one end and a rotatable boom joint assembly at the other end, said first boom connected to said boom pivot member via said first boom pivot;
   an elongated second boom connected to said boom joint assembly at one end;
   a wheel lifting bar operatively attached to an end of said second boom;
   an upper boom pivot member rigidly attached to said mounting frame assembly; and,
   a first boom saddle rigidly attached to a first side of said mounting frame assembly;
   wherein said first boom pivot rotates within said upper boom pivot member;

wherein said first boom pivot is retained by said upper boom pivot member and said boom pivot member;

wherein said first boom saddle is located and dimensioned to receive said first boom when said first boom maximally pivots in a first direction; and, wherein said first boom and said second boom can rotate and pivot to bring said wheel lifting bar into position to remove a wheel from said combine.

2. The wheel installation crane according to claim 1, further comprising a platform that extends between said first wheel support member and said second wheel support member, and wherein said platform, said first wheel support member, said second wheel support member said first extension, said second extension and said wheel support bar form a receptor for a tire and rim.

3. The wheel installation crane according to claim 2, wherein said platform has a grated surface.

4. The wheel installation crane according to claim 1, wherein said first extension is attached to said first wheel support member by an extension hinge, wherein said second extension is attached to said second wheel support member by another extension hinge, and wherein said first extension and said second extension can respectively fold backwards onto said first wheel support member and said second wheel support member.

5. The wheel installation crane according to claim 1, further including a strap ratcheting mechanism disposed between said first wheel support member and said second wheel support member.

6. The wheel installation crane according to claim 1, wherein said first extension includes an aperture and wherein said wheel support bar passes through said aperture.

7. The wheel installation crane according to claim 1, further including a second boom saddle rigidly attached to a second side of said mounting frame assembly, wherein said second boom saddle is located and dimensioned to receive said first boom when said first boom maximally pivots in a second direction.

8. The wheel installation crane according to claim 7, wherein said second boom saddle includes a retainer system for retaining said first boom within said second boom saddle.

9. The wheel installation crane according to claim 1, wherein said boom joint assembly extends down from the other end of said first boom and wherein said second boom attaches to said boom joint assembly above the other end of said first boom.

10. The wheel installation crane according to claim 9, further including a hydraulic lift disposed between the lower end of said boom joint assembly and said second boom.

11. The wheel installation crane according to claim 10, further including hydraulic lines attached to said hydraulic lift for applying hydraulic forces from said combine to said hydraulic lift.

12. The wheel installation crane according to claim 11, further including at least one hook attachment connected to an end of said second boom.

13. The wheel installation crane according to claim 12, further including a connector for attaching said wheel lifting bar to said at least one hook attachment.

14. The wheel installation crane according to claim 13, wherein said wheel lifting bar is "C"-shaped.

15. The wheel installation crane according to claim 14, further including a bearing plate attached to said wheel lifting bar.

16. The wheel installation crane according to claim 15, wherein said bearing plate includes a plurality of bearings.

17. A wheel installation crane, comprising:

a mounting frame assembly for attaching to a combine, said mounting frame assembly having a horizontal first wheel support member and a horizontal second wheel support member that protrude from the lower part of said mounting frame assembly, a first extension connected to said first wheel support member by a first pivot and having a first aperture at its distal end, a second extension connected to said second wheel support member by a second pivot and having a second aperture at its distal end, a removable wheel support bar that extends through said first aperture and said second aperture, and a lock for temporarily securing said removable wheel support bar between said first extension and said second extension;

a lower boom pivot member rigidly mounted to the bottom of said mounting frame assembly;

an upper boom pivot member rigidly mounted to the top of said mounting frame assembly;

an elongated first boom having a first boom pivot at one end and a rotatable boom joint assembly at the other end, said first boom pivot connected between said upper boom pivot member and said lower boom pivot member;

an elongated second boom connected to said boom joint assembly at one end; and, a "C"-shaped wheel lifting bar operative attached to an end of said second boom;

wherein said first boom and said second boom can rotate and pivot to bring said wheel lifting bar into position to remove a wheel from said combine; and, wherein said upper boom pivot member and said lower boom pivot member are offset from the center of said mounting frame assembly.

18. The wheel installation crane according to claim 17, further comprising:

a grated platform extending between said first wheel support member and said second wheel support member;

a strap ratcheting mechanism disposed between said first wheel support member and said second wheel support member;

a boom saddle rigidly attached to a side of said mounting frame assembly, said boom saddle located and dimensioned to receive said first boom when said first boom maximally pivots in a first direction;

a hydraulic jack disposed between said boom joint assembly and said second boom;

hydraulic lines for supply said hydraulic jack with hydraulic power from said combine;

a connector assembly for attaching said wheel lifting bar to said second boom;

a bearing plate attached to said wheel lifting bar; and, a plurality of bearings retained in said bearing plate.

* * * * *